(12) United States Patent
Roblin et al.

(10) Patent No.: US 9,840,236 B2
(45) Date of Patent: Dec. 12, 2017

(54) METHOD OF, AND APPARATUS FOR, OPERATING A VEHICLE

(71) Applicants: Haldex Brake Products Limited, Warwickshire (GB); Vignal Systems, Venissieux (FR)

(72) Inventors: Christoph Roblin, Chassieu (FR); Guillaume Dupuis, Villeurbanne (FR)

(73) Assignees: Haldex Brake Products Limited, Warwichshire (GB); Vignal Systems, Venissieux (FR)

(*) Notice: Subject to any disclaimer, the term of this patent is extended or adjusted under 35 U.S.C. 154(b) by 72 days.

(21) Appl. No.: 14/245,432

(22) Filed: Apr. 4, 2014

(65) Prior Publication Data

US 2014/0303866 A1   Oct. 9, 2014

(30) Foreign Application Priority Data

Apr. 4, 2013   (GB) .................................. 1306099.1

(51) Int. Cl.
| | |
|---|---|
| *B60T 7/22* | (2006.01) |
| *G08G 1/16* | (2006.01) |
| *B60K 31/00* | (2006.01) |
| *G01S 13/93* | (2006.01) |

(52) U.S. Cl.
CPC ............ *B60T 7/22* (2013.01); *B60K 31/0008* (2013.01); *G08G 1/168* (2013.01); *B60T 2201/022* (2013.01); *B60T 2230/08* (2013.01); *G01S 2013/9317* (2013.01); *G01S 2013/9378* (2013.01); *G01S 2013/9389* (2013.01)

(58) Field of Classification Search
CPC ......... B60T 2230/08; G01S 2013/9317; G01S 2013/9378; G01S 2013/9389; G08G 1/168
See application file for complete search history.

(56) References Cited

U.S. PATENT DOCUMENTS

| | | | |
|---|---|---|---|
| 3,898,652 A | 8/1975 | Rashid | |
| 4,574,908 A * | 3/1986 | Brick | B60T 7/22 180/169 |
| 4,591,019 A | 5/1986 | Fisher et al. | |
| 5,948,035 A * | 9/1999 | Tomita | B60T 8/172 180/197 |
| 6,072,391 A * | 6/2000 | Suzuki | B60K 35/00 340/435 |
| 6,517,172 B1 * | 2/2003 | Bond, III | B60Q 9/008 303/193 |

(Continued)

FOREIGN PATENT DOCUMENTS

| | | |
|---|---|---|
| DE | 4201806 | 9/1992 |
| DE | 4404527 | 8/1995 |

(Continued)

*Primary Examiner* — Thomas Ingram
(74) *Attorney, Agent, or Firm* — Young Basile Hanlon & MacFarlane, P.C.

(57) ABSTRACT

A method of operating a vehicle wherein the method comprises using a distance sensor to determine the distance between a part of the vehicle and an object, and implementing a speed control procedure if the distance detected by the distance sensor falls below a predetermined value, characterized in that the method is implemented only while the vehicle is in reverse gear and for a period of time immediately following disengagement of the reverse gear.

22 Claims, 4 Drawing Sheets

(56) References Cited

U.S. PATENT DOCUMENTS

| | | | |
|---|---|---|---|
| 6,594,614 B2* | 7/2003 | Studt | G01S 7/06 180/167 |
| 6,604,592 B2 | 8/2003 | Pietsch et al. | |
| 2005/0270177 A1* | 12/2005 | Mori | B60T 7/12 340/932.2 |
| 2007/0132563 A1* | 6/2007 | Balbale | B60Q 9/004 340/435 |
| 2013/0297173 A1* | 11/2013 | Takagi | G01S 13/862 701/70 |

FOREIGN PATENT DOCUMENTS

| | | |
|---|---|---|
| GB | 2118753 | 11/1983 |
| GB | 2310731 | 9/1997 |
| GB | 2458655 | 9/2009 |
| WO | 2012095717 | 7/2012 |

* cited by examiner

METHOD OF, AND APPARATUS FOR, OPERATING A VEHICLE

REFERENCE TO RELATED APPLICATION

This application claims priority to United Kingdom patent application No. 1306099.1, which was filed on Apr. 4, 2013.

TECHNICAL FIELD

This invention relates to a method of, and apparatus for, controlling the speed of a vehicle. More particularly, this invention relates to a method of controlling a vehicle when the vehicle is reversing.

BACKGROUND

It is often required for a vehicle to be maneuvered into a position near one or more objects. For example, it is common for a truck or the like to be required to be reversed into a loading/unloading bay. Often, it is very difficult for a driver of the vehicle to determine how far a rear end of the vehicle is positioned from the loading bay, and thus, frequently, the vehicle collides with the loading/unloading bay through an error in judgement by the driver. Such collisions often cause serious damage to the loading/unloading bay and/or to the rear of the vehicle.

In an effort to avoid this problem, it has been proposed to provide the rear of the vehicle with a distance sensor which senses a distance between a rearmost part of the vehicle and the closest object near the rear of the vehicle and to use the distance determined by the distance sensor automatically to reduce the speed of the vehicle to ensure that the vehicle does not collide with the object.

Such a system is disclosed in U.S. Pat. No. 6,604,592. In this prior art system, when the vehicle is placed in reverse mode, sensed distance values from the distance sensor are sent to a controller, and the controller limits the speed of the vehicle to a maximum permissible vehicle speed value which depends on the distance value detected by the distance sensor. If the distance value is greater than a first amount, the maximum permissible vehicle speed is set to a first value; if the distance value is less than the first amount by greater than a second amount, the maximum permissible vehicle speed is set to a second value; and if the distance value is less than the second amount, the vehicle speed is controlled such that the vehicle comes to a stop before contacting the object.

Examples of similar prior art systems are also disclosed in U.S. Pat. No. 3,898,652, U.S. Pat. No. 4,574,908, and GB 2458655.

In all these systems, the distance sensors are active, or signals from the distance sensors are processed and acted on, only when the vehicle is in reverse gear. As a result, there is no automatic application of the vehicle brakes as a result of the proximity to an object at the rear of the vehicle when the reverse gear is not engaged.

SUMMARY

According to a first aspect of the invention we provide a method of operating a vehicle wherein the method comprises:

using a distance sensor to determine the distance between a part of the vehicle and an object, and implementing a speed control procedure if the distance detected by the distance sensor falls below a predetermined value, characterised in that the method is implemented only whilst the vehicle is in reverse gear and for a period of time immediately following disengagement of the reverse gear.

In one embodiment of the invention, the method is implemented immediately following disengagement of the reverse gear until the speed of the vehicle falls below a predetermined level.

In one embodiment of the invention, the method is implemented immediately following disengagement of the reverse gear until the expiry of a predetermined length of time after disengagement of the reverse gear.

In one embodiment of the invention, the method is implemented immediately following disengagement of the reverse gear until the speed of the vehicle falls below a predetermined level or until the expiry of a predetermined length of time after disengagement of the reverse gear, whichever occurs sooner.

The speed control procedure may comprise obtaining from a wheel speed sensor an output signal indicative of a rotational speed of the wheel, using the rotational speed of the wheel and the output signal from the load sensor to calculate a braking force required to bring the vehicle to a stop when the vehicle has travelled a predetermined proportion of the predetermined distance value, and ensuring that the calculated braking force is applied to the vehicle.

The speed control procedure may include, if an operator is already causing a braking force to be applied to one or more wheels of the vehicle, determining whether the applied braking force is sufficient to reduce the speed of the vehicle so that the vehicle does not collide with the object and, if the braking force already being applied is not sufficient, applying additional braking force to one or more wheels of the vehicle to bring the braking force up to the calculated braking force.

In this case, if the rotational speed of the wheel is such that no meaningful indication of the rotational speed thereof can be provided by the wheel speed sensor, the speed control procedure may include applying a predetermined level of braking force to one or more wheels of the vehicle. Advantageously, the braking force to be applied by the braking device is calculated to bring the vehicle to rest at a predetermined minimum distance away from the object.

According to a second aspect of the invention, we provide a control apparatus for controlling a vehicle having a reverse gear, the apparatus including a distance sensor which, when supplied with electrical power, determines the distance between itself and an object and which is connected to a controller, the controller being programmed to implement a speed control procedure if the distance detected by the distance sensor falls below a predetermined value only whilst the vehicle is in reverse gear and for a period of time immediately following disengagement of the reverse gear.

In one embodiment of the invention, the controller controls the supply of electrical power to the distance sensor and is programmed to switch on the supply of electrical power to the distance sensor when the reverse gear of the vehicle is engaged and to switch off the supply of electrical power to the distance sensor after a period of time immediately following disengagement of the reverse gear.

In one embodiment of the invention, the controller is programmed to implement a speed control procedure immediately following disengagement of the reverse gear until the speed of the vehicle falls below a predetermined level.

In one embodiment of the invention, the controller is programmed to implement a speed control procedure immediately following disengagement of the reverse gear until the expiry of a predetermined length of time after disengagement of the reverse gear.

In one embodiment of the invention, the controller is programmed to implement a speed control procedure immediately following disengagement of the reverse gear until the speed of the vehicle falls below a predetermined level or until the expiry of a predetermined length of time after disengagement of the reverse gear, whichever occurs sooner.

The control apparatus according to the present invention may further include a wheel speed sensor mountable on or near a wheel of the vehicle for sensing a rotational speed of the wheel, the wheel speed sensor being connected to the controller so it can provide the controller with an output signal indicative of the sensed rotational speed of the wheel and a load sensor for sensing any additional load supported by the vehicle, the load sensor being connected to the controller so that it can provide the controller with an output signal indicative of the load, wherein the controller is programmed such that the speed control procedure comprises using the output signal from the wheel speed sensor and the output signal from the load sensor to calculate the braking force required to bring the vehicle to a stop within a predetermined distance from the object and transmitting a signal to a braking device so as to ensure that the braking device applies the calculated braking force to one or more wheels of the vehicle.

According to a third aspect of the invention, we provide a vehicle comprising a control apparatus having any feature or combination of features of the control apparatus of the second aspect of the invention.

BRIEF DESCRIPTION OF THE DRAWINGS

Examples of the invention will now be described by way of example only with reference to the accompanying drawings, of which.

DETAILED DESCRIPTION

Figure 1:
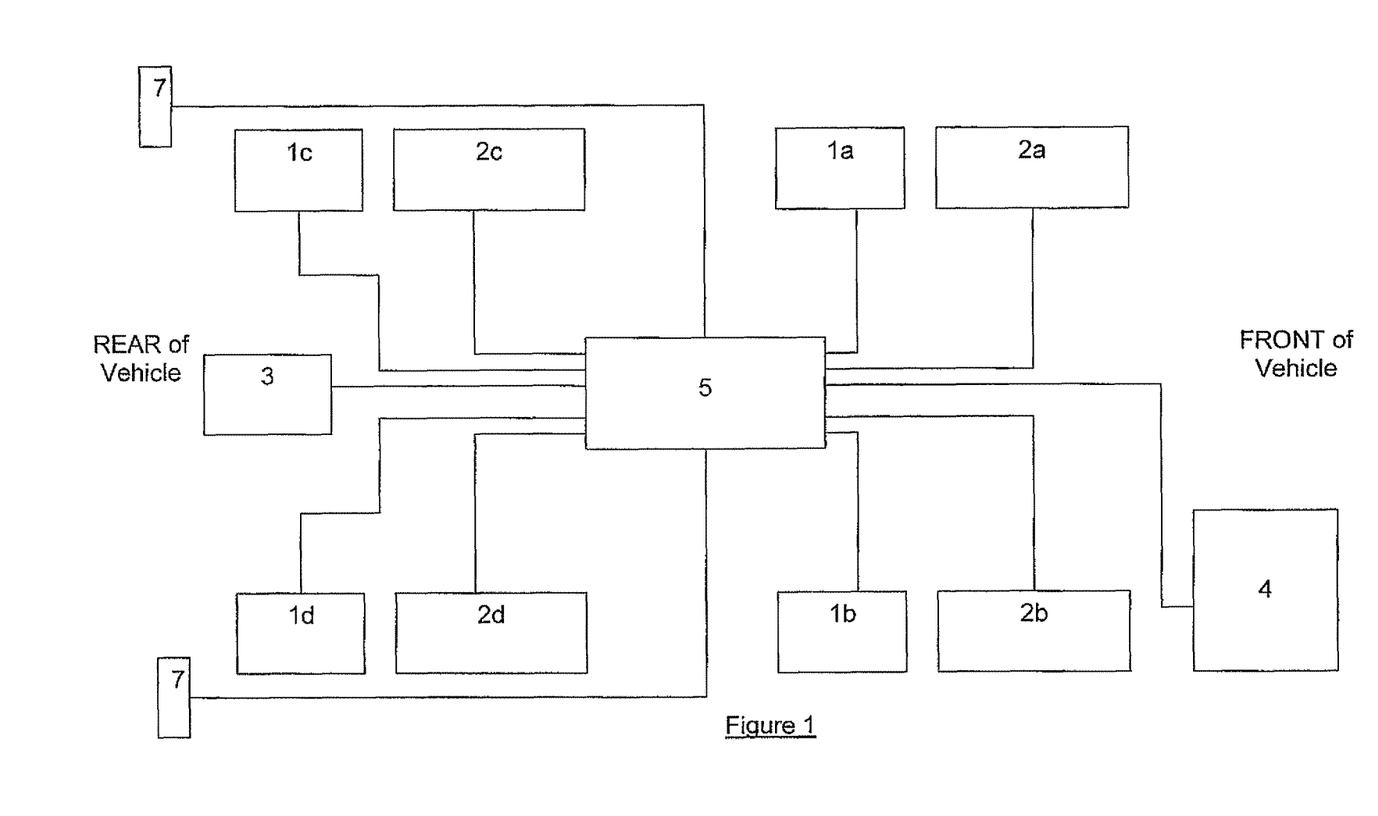
FIG. 1 is a schematic view of the components required for carrying out the method of the present invention.

Referring firstly to FIG. 1, this shows a schematic layout of the apparatus required to be installed on a vehicle so that the method of the present invention can be performed. The apparatus can be applied to the trailer of an articulated lorry, i.e., a lorry which has a tractor and a towed trailer which itself has two or more wheels on a non-articulated vehicle or on both the tractor and trailer of an articulated vehicle.

The two front wheels of the vehicle and the two rearmost wheels of the vehicle are provided with braking devices 1a-1d of a known kind, e.g., a pneumatically or hydraulically operated brake, the operation of which is controlled by an electronic controller 5. The controller 5 may be an electronic control unit for an electronic braking system (EBS).

Of course, if the vehicle has other wheels, these can, if desired, be provided with respective braking devices. Each braking device 1a-1d is operable to apply braking force to its respective wheel to slow that wheel. Braking of the vehicle can, as is normal in conventional vehicles fitted with EBS, be initiated by the driver by actuation of a brake pedal or lever 4 positioned in the driver's cab, operation of the brake pedal or lever 4 causing the braking devices 1a-1d to be actuated so as to cause a braking force to be applied to one or more wheels of the vehicle to slow the vehicle.

Each wheel is also provided with a wheel speed sensor 2a-2d, which is configured to sense a rotational speed of its respective wheel and to provide an output indicative of the sensed rotational speed to the controller 5. Such wheel sensors are preferably those provided as part of conventional EBS with anti-lock braking control.

Although in the present example each wheel is provided with a respective wheel speed sensor 2a-2d, it is not necessary for each wheel to have a wheel speed sensor. Indeed, the method of the present invention could work adequately with a wheel speed sensor provided on only one wheel.

Mounted on the vehicle, in this example at a rear end thereof, is a distance sensor 3, e.g., an ultrasonic distance sensor or any other appropriate sensor. The distance sensor is configured to sense when a rearmost part of the vehicle is within a predetermined distance of an object, e.g., a loading/unloading bay, and is connected to the controller 5, thus enabling it to provide an output signal to the controller 5 when the object is within the predetermined distance of the rear of the vehicle. The distance sensor 3 is preferably powered using the same electrical power supply as the vehicle's electronic braking system, the controller 5 being operable to control supply of power to the distance sensor 3.

Where the vehicle is an articulated lorry, the distance sensor 3 is preferably positioned towards a rearmost end of the trailer and is configured to sense when a rearmost part of the trailer is within a predetermined distance of the loading/unloading bay.

The vehicle is also provided with, in this example, two reversing lights 7c, 7d, i.e., lights which are powered to light up when the vehicle's reverse gear is engaged, as is conventional. In the inventive system, however, the reversing lights are electrically connected to controller 5 so that an input signal can be transmitted to the controller 5 when the reversing lights 7c, 7d are on. Thus, the controller 5 can use this input signal to determine whether or not the vehicle's reverse gear is engaged.

Figure 2:
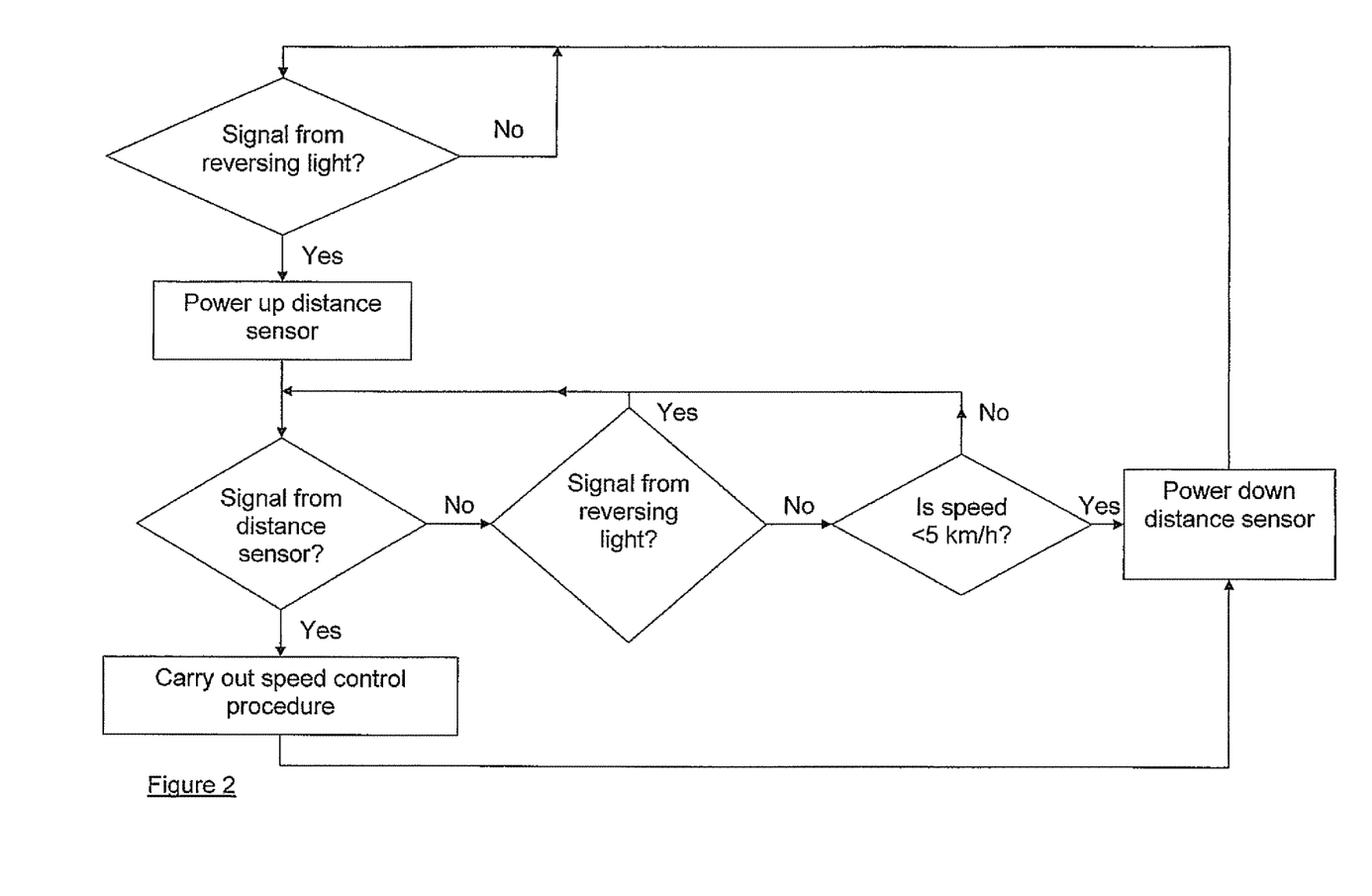
FIG. 2 is a flow diagram illustrating steps of the method of one embodiment of the present invention.

Turning now to the flow diagram of FIG. 2, when the controller 5 receives an input signal from the reversing lights 7c, 7d because the vehicle is reversing, for example into a loading/unloading bay, the controller 5 powers up the distance sensor 3 at the rear of the trailer. The distance sensor 3 checks, either constantly or intermittently, the distance between a rearmost part of the vehicle and an outermost projecting part of the loading/unloading bay. Where the distance sensor 3 is programmed to carry out this check intermittently, it must do this sufficiently frequently, say every 0.1 second, that there is no real risk of the vehicle colliding with the loading/unloading bay before the distance sensor 3 detects that the object is within the predetermined range. In this example, the predetermined distance is 1 meter.

The controller 5 also monitors for receipt of a signal from the reversing lights 7c, 7d, and if this signal ceases because the driver has disengaged the reverse gear, the controller 5 carries out a check to establish if the speed of the vehicle is greater than a pre-determined value. For example, the controller 5 may obtain from one or more of the wheel speed sensors 2a to 2d an indication of the rotational speed of the wheel and use this information to calculate the vehicle speed. Whilst the speed of the vehicle is greater than the predetermined value, the controller continues to monitor for receipt of a signal from the distance sensor 3. If, on the other hand, the speed of the vehicle falls to less than the predetermined value, in this example 5 km/hr, the controller 5 switches off the power supply to the distance sensor 3. The process can then start again next time the reverse gear is engaged.

If the rearmost part of the vehicle moves to within the predetermined distance of the loading/unloading bay, the distance sensor 3 sends a signal to the controller 5. The controller 5 then initiates a speed control procedure, one example of which is illustrated schematically in FIG. 4 and described in more detail below. After the speed control procedure is complete, the controller 5 switches off power to the distance sensor 3.

In an alternative embodiment of the invention, instead of considering the vehicle speed, the controller 5 may simply be programmed to switch off the power supply to the distance sensor 3 a predetermined time (say 60 seconds) after it detects that it is no longer receiving a signal from the reversing lights 7c, 7d.

Figure 3:
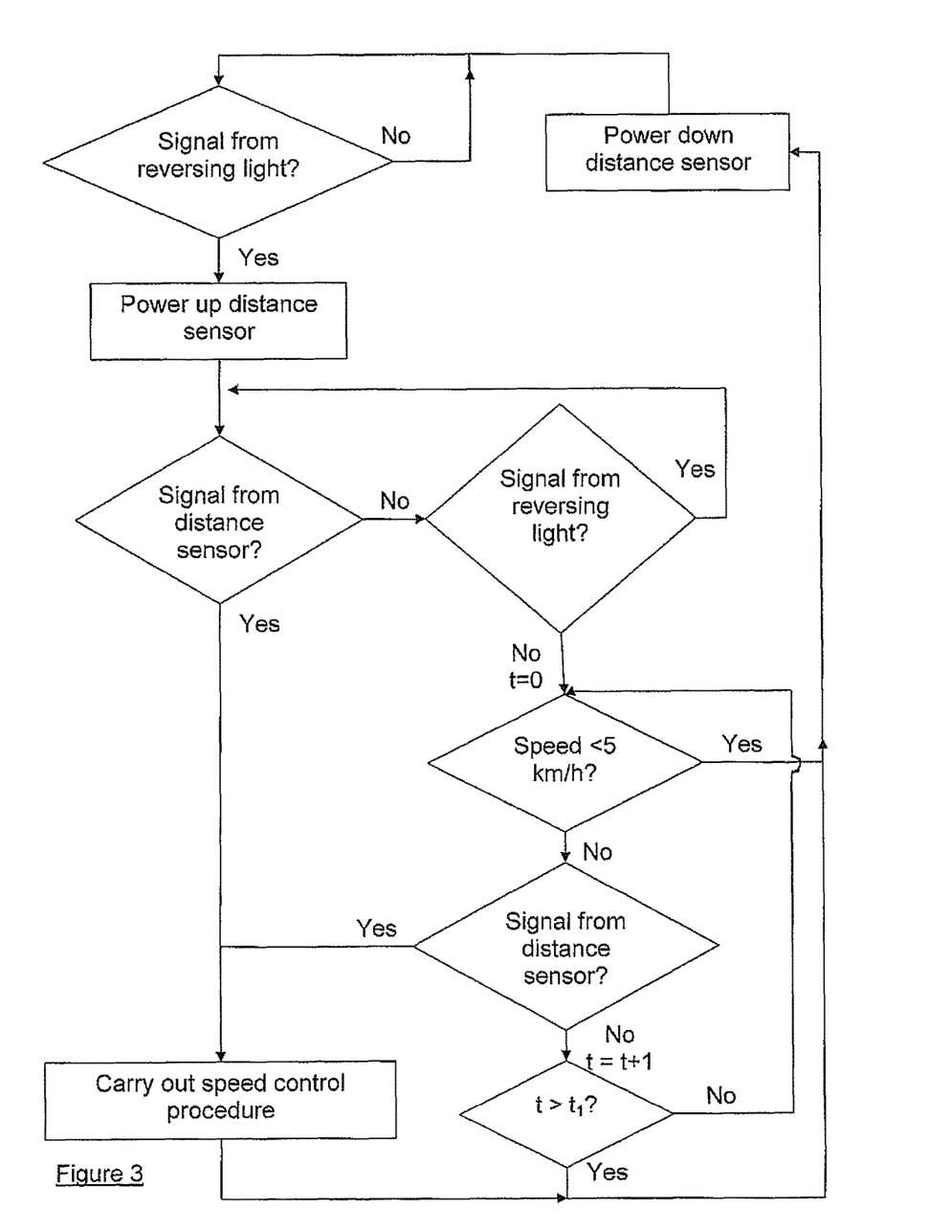
FIG. 3 is a flow diagram illustrating steps of the method of an alternative embodiment of the present invention.

In a further alternative embodiment of the invention, the controller 5 may be programmed to switch off the power supply to the distance sensor 3 when the speed of the vehicle falls below a predetermined level (5 km/h say) or after a predetermined period of time (say 60 seconds) from the time at which it detects that it is no longer receiving a signal from the reversing lights 7c, 7d, whichever happens soonest. A flow chart showing how the controller 5 may operate to implement this embodiment of the invention is illustrated in FIG. 3.

Clearly, it would not be desirable for the speed control procedure to be implemented when the vehicle is being driven forwards away from an object close to its rear end. The system is therefore configured such that implementation of the speed control procedure is linked to the engagement of the vehicle's reverse gear. It will be appreciated, however, that, unlike in the prior art systems, the speed control procedure can be initiated for a period of time after the reverse gear has been disengaged. This prevents a driver from avoiding initiation of the speed control procedure by reversing towards a loading/unloading bay at a reasonable speed, disengaging the reverse gear just before the vehicle is within the predetermined distance from the loading/unloading bay, and allowing the vehicle to coast into the loading/unloading bay in neutral until it comes to a stop naturally, perhaps by bumping into the loading/unloading bay.

In this embodiment of the invention, this is achieved by the controller 5 controlling the supply of electrical power to the distance sensor 3. The distance sensor 3 is only powered to monitor the distance between the rear of the vehicle and the nearest object when the reverse gear is engaged or immediately after disengagement of the reverse gear as discussed above. It should be appreciated, however, that this need not be the case, and the distance sensor 3 could be active at all times whilst the vehicle engine is running, for example. In this case, the controller 5 would be programmed to implement the speed control procedure when in receipt of a signal from the distance sensor 3 indicating that the rear of the vehicle is less than the predetermined distance from the nearest object, only whilst when the reverse gear is engaged or immediately after disengagement of the reverse gear as discussed above.

Moreover, whilst in this embodiment of the invention, the distance sensor 3 sends a signal to the controller 5 only when the rear of the vehicle is less than the predetermined distance from the nearest object, and the distance sensor 3 could send a distance signal to the controller 5 at regular intervals with the controller 5 making the determination as to whether the rear of the vehicle is less than the predetermined distance from the nearest object.

Figure 4:
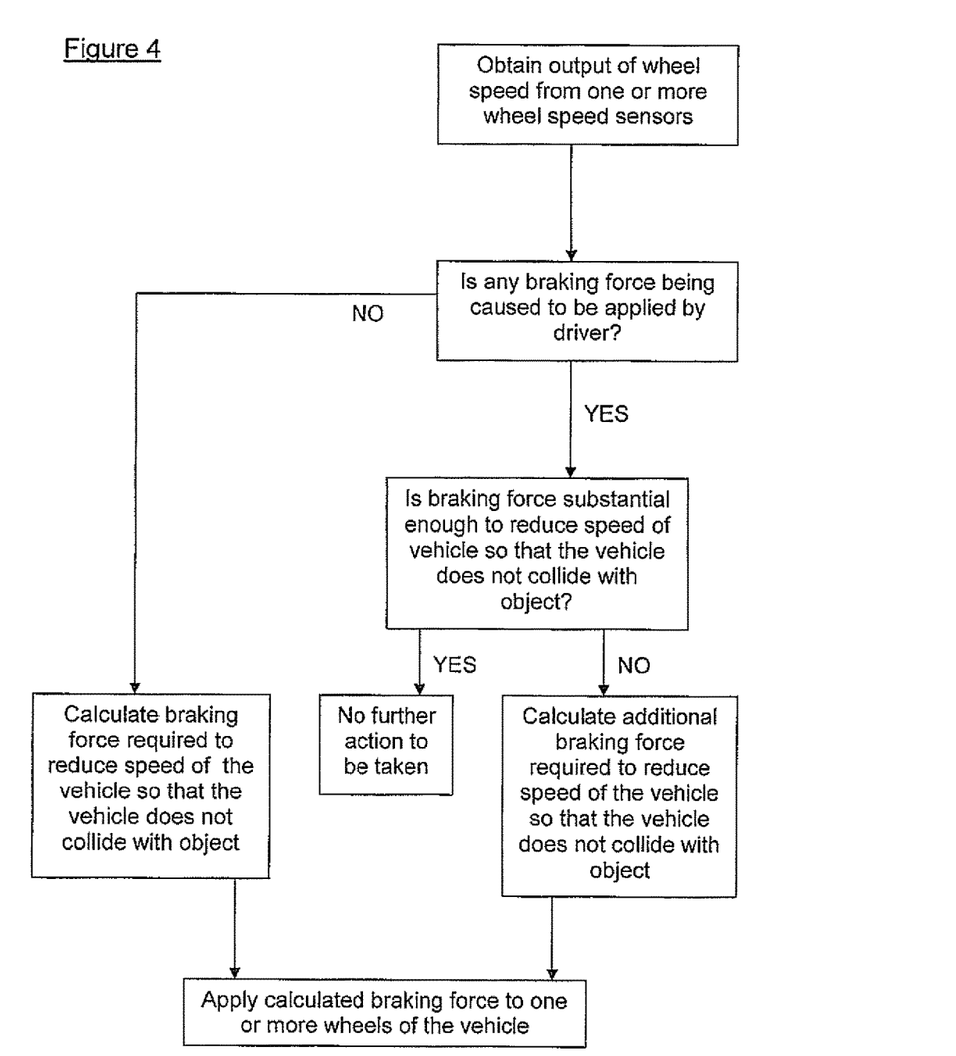
FIG. 4 is a flow diagram illustrating steps in a speed control procedure suitable for use in the present invention.

When the controller 5 receives a signal from the distance sensor 3 indicating that the rearmost part of the vehicle is within the predetermined distance of the loading/unloading bay, the controller 5 obtains from one or more of the wheel speed sensors 2a to 2d an indication of the rotational speed of the wheel. It then determines what, if any, braking force is required to be applied by the braking devices 1a-1d to the wheels of the vehicle so as to slow the vehicle so that the rearmost part of the vehicle does not collide with the loading/unloading bay.

The required braking force may be calculated as follows:

The data known to the controller 5, at the instant in time when the rear of the vehicle moves within 1 meter of the loading/unloading bay, is:

1. Vehicle speed—calculated from the rotation wheel speed measurement;
2. Distance to collision with loading/unloading bay—1 meter; and
3. Brake performance, i.e., braking force required to produce a desired retardation of the vehicle.

It is known that the following equation of motion of a moving body is true:

$$V^2 = U^2 + 2AS \quad (1)$$

where, S=distance (m)
U=initial speed (ms$^{-1}$)
V=final speed (ms$^{-1}$)
A=acceleration (ms$^{-2}$)
Rearranging this equation gives:

$$A = \frac{V^2 - U^2}{2S}$$

In order to calculate the deceleration required to stop the vehicle before it collides with the loading/unloading bay, it will be appreciated that the final velocity V is zero, U is the speed signal derived from the wheel speed sensors, and S is the required stopping distance. When, as in this example, the distance sensor 3 is configured to send a signal to the controller 5 when the vehicle is 1 m from the object, the desired stopping distance may be 0.8 m, for example. There will be a known time delay ($T_d$) in the brakes being applied to the wheels, so this should also be taken into account. Thus, the actual stopping distance will be (S–U·$T_d$).

Given the zero value of V, rearranging equation (1) to find A gives:

$$A = \frac{-U^2}{2(S - UT_d)} \quad (2)$$

It is then necessary to calculate the brake pressure required to produce this deceleration, but as the system could be fitted to many different types of vehicles carrying different loads, in order to keep the system as simple as possible, as estimate is made as to the braking force required as follows:

For a fully laden tractor/trailer combination, the approximate relationship between the deceleration and brake pressure is known and may be programmed into the controller. For example, in many cases, to achieve a deceleration of 0.1 g, approximately 1 bar of air pressure is required to be applied to the brake actuators. So, the brake pressure P required to achieve a deceleration of magnitude A can be estimated to be:

$$P = 10 \cdot A/g \tag{3}$$

Combining equations (2) and (3) and solving for P gives:

$$P = \frac{10 \cdot U^2 \cdot K_f}{2 \cdot g(S - UT_d)} \tag{4}$$

where, $K_f$=Trailer braking factor

The trailer braking factor, $K_f$, is used to compensate for the fact that the braking force is applied to the trailer brakes only and not to the tractor. Where the vehicle includes a vehicle load sensor to provide an indication of the loading of the vehicle, the vehicle load sensor output may be used to calculate the reduction in braking pressure required to compensate for loads of less than 100% of the full vehicle capacity. In this case, $K_f$ is dependent on the weight of the trailer, i.e., whether or not the trailer is empty, as the full trailer will require a larger braking force than an empty trailer. To do this, one or more load sensors may be provided on the trailer, or at the connection of the trailer to the towing part of the vehicle, so that measurements from the(se) sensor(s) is/are sent to the controller 5, so that the controller 5 can make a more accurate determine of the value of $K_f$.

For the example above, where the predetermined distance to the loading/unloading bay is 1 meter, the controller 5 will calculate, using equation (4) above, the required braking force which is required to be applied to the wheels and will send an appropriate signal to each braking device 1a-1d to effect the desired operation thereof.

If a driver of the vehicle is already causing a braking force to be applied to the wheels of the vehicle, by actuation of the brake pedal or lever 4, the controller 5 will take this into account when calculating the required braking force. If the braking force already being applied by the driver is not sufficient enough, i.e., is not equal to or greater than the calculated brake pressure value, P, from equation (4), the controller 5 will send a signal to each of the braking devices 1a-1d to effect an increase in the braking force being applied thereby to the calculated braking force. Of course, if the braking force already being applied by the driver is greater than the brake pressure value, P, calculated by the controller 5, no additional braking will be applied to the wheels.

It should be appreciated, however, that the invention is not restricted to use with this example of speed control procedure, and other procedures, such as the ones described in U.S. Pat. No. 6,604,592, U.S. Pat. No. 3,898,652 or U.S. Pat. No. 4,574,908 could equally be used.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of operating a vehicle having a reverse gear, wherein the method comprises: determining, using a distance sensor, the distance between a part of the vehicle and an object and implementing a speed control procedure when the distance detected by the distance sensor of the part of the vehicle and the object falls below a predetermined value, characterized in that the method further comprises monitoring the engagement of the reverse gear and during a predetermined period of time immediately following detection of the disengagement of the reverse gear, determining using the distance sensor the distance between the part of the vehicle and the object and, when the determined distance falls below a predetermined value, implementing a speed control procedure.

2. A method of operating a vehicle according to claim 1 wherein the speed control procedure comprises:
   obtaining from a wheel speed sensor an output signal indicative of a rotational speed of the wheel; and
   using the rotational speed of the wheel and the output signal from a load sensor, the load sensor being utilized for sensing any additional load supported by the vehicle, to calculate a braking force required to bring the vehicle to a stop when the vehicle has travelled a predetermined proportion of the predetermined distance value, and ensuring that the calculated braking force is applied to the vehicle.

3. A method of operating a vehicle according to claim 2 wherein the speed control procedure includes, if an operator is already causing a braking force to be applied to one or more wheels of the vehicle, determining whether the applied braking force is sufficient to reduce the speed of the vehicle so that the vehicle does not collide with the object and, if the braking force already being applied is not sufficient, applying additional braking force to one or more wheels of the vehicle to bring the braking force up to the calculated braking force.

4. A method of operating a vehicle according to claim 2 wherein if the rotational speed of the wheel is such that if no meaningful indication of the rotational speed thereof can be provided by the wheel speed sensor, the speed control procedure includes applying a predetermined level of braking force to one or more wheels of the vehicle.

5. A method of operating a vehicle according to claim 2 wherein the braking force to be applied by the braking device is calculated to bring the vehicle to rest at a predetermined minimum distance away from the object.

6. A control apparatus for controlling a vehicle having a reverse gear, the apparatus including a distance sensor which when supplied with electrical power determines the distance between itself and an object, and which is connected to a controller, the controller being programmed to monitor the engagement of the reverse gear and, during a predetermined time following detection of disengagement of the reverse gear, to determine using the distance sensor the distance between the distance sensor and an object and when the distance determined by the distance sensor falls below a predetermined value, to implement a speed control procedure.

7. A control apparatus according to claim 6 wherein the controller controls the supply of electrical power to the distance sensor and is programmed to switch on the supply of electrical power to the distance sensor when the reverse gear of the vehicle is engaged, and to switch off the supply of electrical power to the distance sensor after a period of time immediately following detection of the disengagement of the reverse gear.

8. A control apparatus according to claim 6 further including a wheel speed sensor mountable on or near a wheel of the vehicle for sensing a rotational speed of the wheel, the wheel speed sensor being connected to the controller so it can provide the controller with an output signal indicative of the sensed rotational speed of the wheel, a load sensor for sensing any additional load supported by the vehicle, the load sensor being connected to the controller so that it can provide the controller with an output signal indicative of the load, wherein the controller is programmed such that the speed control procedure comprises using the output signal from the wheel speed sensor and the output signal from the load sensor to calculate the braking force required to bring the vehicle to a stop within a predetermined distance from the object and transmitting a signal to a braking device so as to ensure that the braking device applies the calculated braking force to one or more wheels of the vehicle.

9. A vehicle having a reverse gear and comprising a control apparatus including a distance sensor which, when supplied with electrical power, determines the distance between itself and an object, and which is connected to a controller, the controller being programmed to monitor the engagement of the reverse gear and, during a predetermined time following detection of disengagement of the reverse gear, to determine using the distance sensor the distance between the distance sensor and an object and, when the distance detected by the distance sensor falls below a predetermined value, to implement a speed control procedure.

10. A vehicle according to claim 9 wherein the controller controls the supply of electrical power to the distance sensor and is programmed to switch on the supply of electrical power to the distance sensor when the reverse gear of the vehicle is engaged, and to switch off the supply of electrical power to the distance sensor after the predetermined period of time immediately following detection of the disengagement of the reverse gear.

11. A vehicle according to of claim 9 further including a wheel speed sensor mountable on or near a wheel of the vehicle for sensing a rotational speed of the wheel, the wheel speed sensor being connected to the controller so it can provide the controller with an output signal indicative of the sensed rotational speed of the wheel, a load sensor for sensing any additional load supported by the vehicle, the load sensor being connected to the controller so that it can provide the controller with an output signal indicative of the load, wherein the controller is programmed such that the speed control procedure comprises using the output signal from the wheel speed sensor and the output signal from the load sensor to calculate the braking force required to bring the vehicle to a stop within a predetermined distance from the object and transmitting a signal to a braking device so as to ensure that the braking device applies the calculated braking force to one or more wheels of the vehicle.

12. A method of operating a vehicle wherein the method comprises:
monitoring the engagement of the reverse gear using a distance sensor to determine the distance between a part of the vehicle and an object when the vehicle is not in reverse gear and implementing a speed control procedure when the distance detected by the distance sensor falls below a predetermined value, characterised in that the method is implemented immediately following detection of the disengagement of the reverse gear until the speed of the vehicle falls below a predetermined level.

13. A method of operating a vehicle according to claim 12 wherein the speed control procedure comprises:
obtaining from a wheel speed sensor an output signal indicative of a rotational speed of the wheel; and
using the rotational speed of the wheel and the output signal from a load sensor, the load sensor being utilized for sensing any additional load supported by the vehicle, to calculate a braking force required to bring the vehicle to a stop when the vehicle has travelled a predetermined proportion of the predetermined distance value and ensuring that the calculated braking force is applied to the vehicle.

14. A method of operating a vehicle according to claim 13 wherein the speed control procedure includes, if an operator is already causing a braking force to be applied to one or more wheels of the vehicle, determining whether the applied braking force is sufficient to reduce the speed of the vehicle so that the vehicle does not collide with the object and, if the braking force already being applied is not sufficient, applying additional braking force to one or more wheels of the vehicle to bring the braking force up to the calculated braking force.

15. A method of operating a vehicle according to claim 13 wherein if the rotational speed of the wheel is such that if no meaningful indication of the rotational speed thereof can be provided by the wheel speed sensor, the speed control procedure includes applying a predetermined level of braking force to one or more wheels of the vehicle.

16. A method of operating a vehicle according to claim 13 wherein the braking force to be applied by the braking device is calculated to bring the vehicle to rest at a predetermined minimum distance away from the object.

17. A control apparatus for controlling a vehicle having a reverse gear, the apparatus including a distance sensor which, when supplied with electrical power, determines the distance between itself and an object, and which is connected to a controller, the controller being programmed to monitor engagement of the reverse gear and, after detection of disengagement of the reverse gear until the speed of the vehicle falls below a predetermined level, to use the distance sensor to determine the distance between the distance sensor and an object and, when the distance detected by the distance sensor falls below a predetermined value, to implement a speed control procedure.

18. A control apparatus according to claim 17 wherein the controller controls the supply of electrical power to the distance sensor and is programmed to switch on the supply of electrical power to the distance sensor when the reverse gear of the vehicle is engaged, and to switch off the supply of electrical power to the distance sensor when the speed of the vehicle falls below a predetermined level following disengagement of the reverse gear.

19. A control apparatus according to claim 17 further including a wheel speed sensor mountable on or near a wheel of the vehicle for sensing a rotational speed of the wheel, the wheel speed sensor being connected to the controller so it can provide the controller with an output signal indicative of the sensed rotational speed of the wheel, a load sensor for sensing any additional load supported by the vehicle, the load sensor being connected to the controller so that it can provide the controller with an output signal indicative of the load, wherein the controller is programmed such that the speed control procedure comprises using the output signal from the wheel speed sensor and the output signal from the load sensor to calculate the braking force required to bring the vehicle to a stop within a predetermined distance from the object and transmitting a signal to a braking device so as to ensure that the braking device applies the calculated braking force to one or more wheels of the vehicle.

20. A vehicle having a reverse gear and comprising a control apparatus including a distance sensor which, when supplied with electrical power, determines the distance between itself and an object and which is connected to a controller, the controller being programmed to monitor engagement of the reverse gear and, after detection of disengagement of the reverse gear until the speed of the vehicle falls below a predetermined level, to use the distance sensor to determine the distance between the distance sensor and an object and, when the distance detected by the distance sensor falls below a predetermined value, to implement a speed control procedure.

21. A vehicle according to claim 20 wherein the controller controls the supply of electrical power to the distance sensor and is programmed to switch on the supply of electrical power to the distance sensor when the reverse gear of the vehicle is engaged, and to switch off the supply of electrical power to the distance sensor when the speed of the vehicle falls below a predetermined level following disengagement of the reverse gear.

22. A vehicle according to of claim 20 further including a wheel speed sensor mountable on or near a wheel of the vehicle for sensing a rotational speed of the wheel, the wheel speed sensor being connected to the controller so it can provide the controller with an output signal indicative of the sensed rotational speed of the wheel, a load sensor for sensing any additional load supported by the vehicle, the load sensor being connected to the controller so that it can provide the controller with an output signal indicative of the load, wherein the controller is programmed such that the speed control procedure comprises using the output signal from the wheel speed sensor and the output signal from the load sensor to calculate the braking force required to bring the vehicle to a stop within a predetermined distance from the object and transmitting a signal to a braking device so as to ensure that the braking device applies the calculated braking force to one or more wheels of the vehicle.

\* \* \* \* \*